United States Patent
Curry, III

(10) Patent No.: US 8,534,003 B2
(45) Date of Patent: Sep. 17, 2013

(54) ROLL-OUT STRUCTURE/HURRICANE SHEATHING

(75) Inventor: James Curry, III, Massapequa, NY (US)

(73) Assignee: Ledgetech Holdings, LLC, Fort Meyers, FL (US)

(*) Notice: Subject to any disclaimer, the term of this patent is extended or adjusted under 35 U.S.C. 154(b) by 160 days.

(21) Appl. No.: 12/491,690

(22) Filed: Jun. 25, 2009

(65) Prior Publication Data

US 2009/0321023 A1    Dec. 31, 2009

Related U.S. Application Data

(63) Continuation-in-part of application No. 11/412,609, filed on Apr. 27, 2006.

(51) Int. Cl.
*E04B 1/346*    (2006.01)
(52) U.S. Cl.
USPC ............................................. 52/71; 52/592.1
(58) Field of Classification Search
USPC .................. 52/71, 592.1; 160/230, 235, 237; 404/35, 47
See application file for complete search history.

(56) References Cited

U.S. PATENT DOCUMENTS

| | | | |
|---|---|---|---|
| 451,437 A | | 4/1891 | Recker et al. |
| 3,247,637 A | * | 4/1966 | Robertson ................. 52/588.1 |
| 3,537,223 A | | 11/1970 | Lerchenthal |
| 3,611,655 A | | 10/1971 | Loebner |
| 4,088,805 A | | 5/1978 | Wiegand |
| 4,277,201 A | * | 7/1981 | Abell ................................. 404/35 |
| 4,315,345 A | * | 2/1982 | Schijf ................................ 16/267 |
| 4,329,739 A | | 5/1982 | Loebner |
| 4,428,791 A | | 1/1984 | Reinke |
| 4,823,531 A | * | 4/1989 | Labelle ............................. 52/586.2 |
| 5,170,832 A | * | 12/1992 | Wagner ............................ 160/201 |
| 5,219,635 A | | 6/1993 | Weiter et al. |
| 5,345,738 A | | 9/1994 | Dimakis |

(Continued)

FOREIGN PATENT DOCUMENTS

EP    123508 A2 * 10/1984
WO    WO 2007/133359 A2    11/2007

OTHER PUBLICATIONS

International Search Report for Application No. PCT/US2010/039916 dated Jan. 20, 2011.

*Primary Examiner* — Christine T Cajilig
(74) *Attorney, Agent, or Firm* — Scully, Scott, Murphy & Presser, P.C.

(57) ABSTRACT

A roll-out sheet of construction material has a plurality of slats, each with a shelf with a generally upward facing surface and a ledge with a generally downwardly facing surface. The plurality of slats are adjacent one another so that the ledge of one slat underlies the shelf of an adjacent slat. A pivoting assembly disposed on each of the plurality of slat allows the slats to articulate relative to one another within a defined range of vertical angles. The slats may have a longitudinal opening at least partially through, which is optionally filled with thermal and/or sound insulation, and/or load-bearing filler. The openings can also include a rib or support extending across the opening and bracing one side wall of the slat against the other. A securing tab can extend outward from one or more slats, shaped as a hoop, or having a through opening. When deployed, the roll-out sheet may be flat or have some angle or curvature.

9 Claims, 11 Drawing Sheets

(56) References Cited

U.S. PATENT DOCUMENTS

| | | |
|---|---|---|
| 5,419,386 A | 5/1995 | Magro et al. |
| 5,927,369 A * | 7/1999 | Pedersen ............ 160/201 |
| 5,941,027 A * | 8/1999 | Hallsten ............. 52/64 |
| 6,017,830 A | 1/2000 | Brown et al. |
| 6,041,846 A | 3/2000 | Langlois |
| 6,113,176 A | 9/2000 | Bernardo |
| 6,470,811 B1 * | 10/2002 | Isinger ............. 108/153.1 |
| 6,474,029 B1 | 11/2002 | Cook et al. |
| 6,558,070 B1 * | 5/2003 | Valtanen ............ 404/35 |
| 6,699,575 B1 | 3/2004 | Dagher et al. |
| 6,715,249 B2 | 4/2004 | Rusek et al. |
| 6,769,218 B2 | 8/2004 | Pervan |
| 6,786,013 B2 | 9/2004 | Coulton |
| 6,931,809 B1 | 8/2005 | Brown et al. |
| 7,090,430 B1 | 8/2006 | Fletcher et al. |
| 2004/0010983 A1 * | 1/2004 | Eshpar ............. 52/71 |
| 2005/0063780 A1 | 3/2005 | Thorne |

* cited by examiner

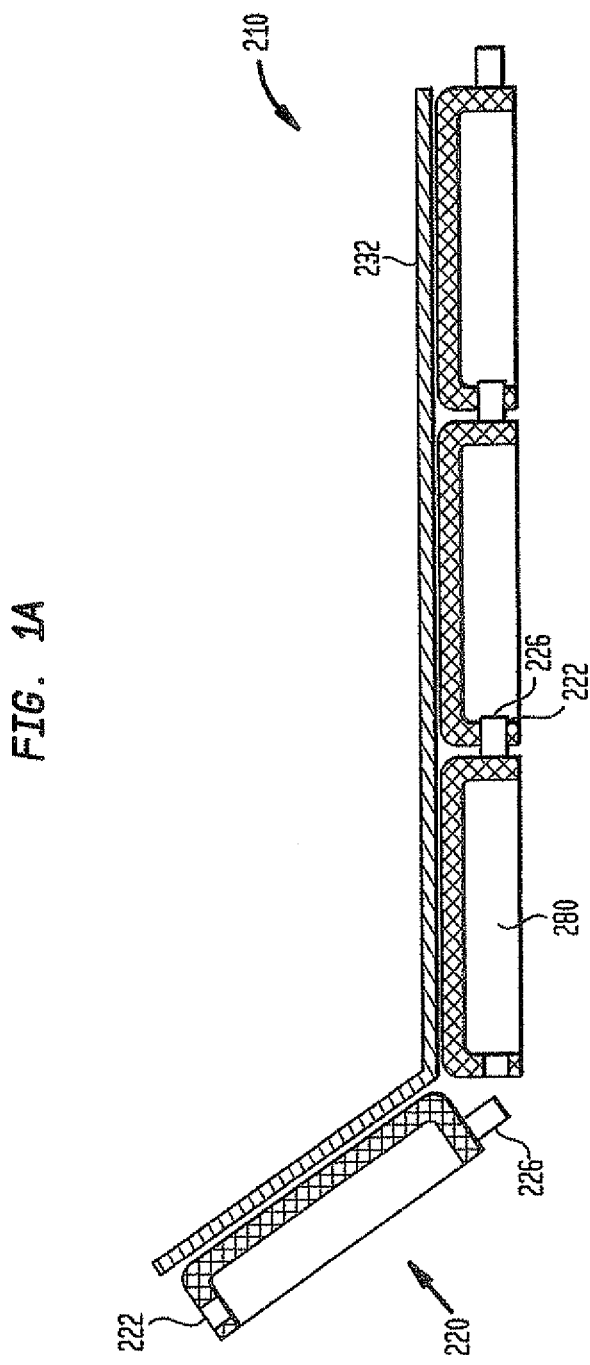

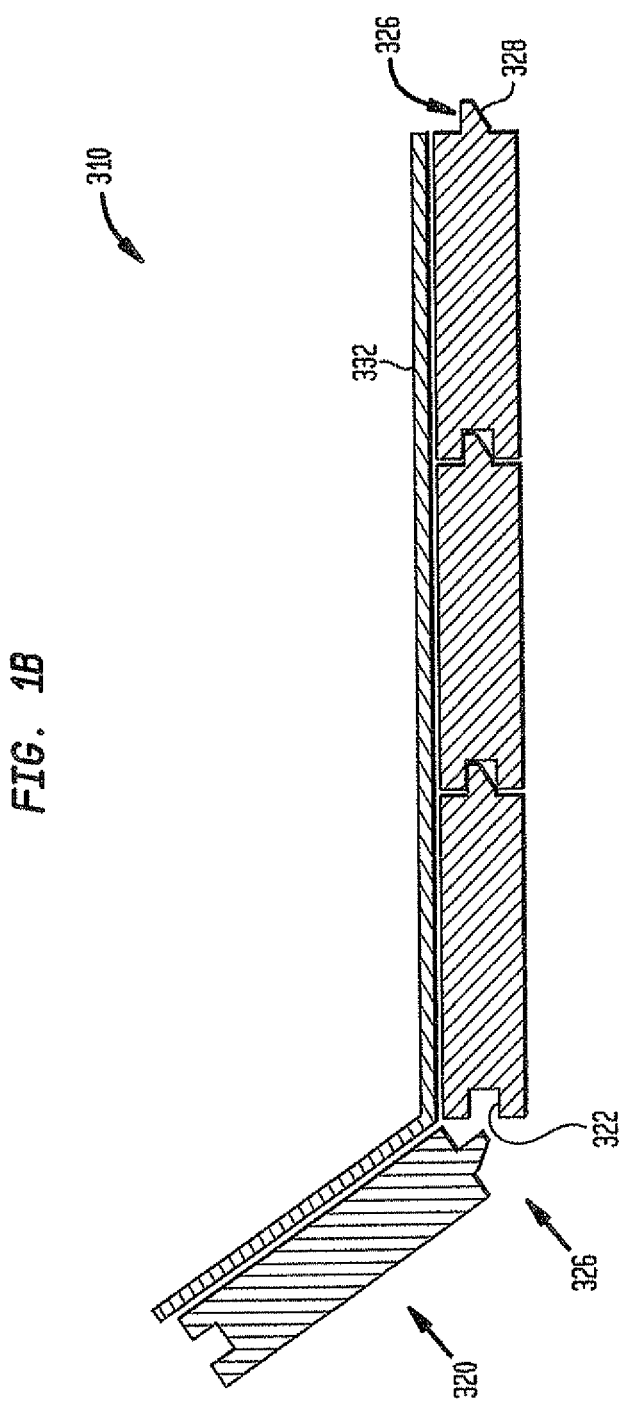

ROLL-OUT STRUCTURE/HURRICANE SHEATHING

CROSS REFERENCE OF RELATED APPLICATIONS

The present invention is a continuation-in-part of co-pending U.S. patent application Ser. No. 11/412,609 filed on Apr. 27, 2006, the contents of which are incorporated herein by reference.

FIELD OF THE INVENTION

The present invention relates to the field of building materials and more particularly to a roll-out building material with load bearing capability.

BACKGROUND OF THE DISCLOSURE

In the construction of building structures, plywood sheets, generally in standard units of 4' by 8' dimension, are often used to cover and enclose the inner structure of walls and roofs, an optionally provide a base of attaching outer finishing materials (e.g., siding or roofing shingles, respectively). The use of plywood has several drawbacks.

Plywood is a natural material, and subject to deterioration over time and exposure to elements. This often necessitates the application of protective sheathing over the plywood as a barrier against moisture, for example. This extra step increases building costs in time and materials. Therefore, a superior barrier sheeting to plywood is desirable.

Further, the process of covering a building frame of any significant size with plywood sheets is time-consuming. Without extraordinary numbers of workers, the process can take several days to complete. During this time, the frame may be exposed to the elements, including rain, which is detrimental to wood frame members. To address this, the frames are typically covered with a house wrap material, for example made of TYVEK®, to protect the frame until the plywood process is complete. However, if the frame can be covered in less time than by plywood, without exposing the framing to the adverse elements for extended periods, the expense of applying the house wrap, both in time and materials, can be saved. Therefore, a sheeting material that can be applied rapidly is desirable.

Moreover, plywood of useable dimensions must be manufactured from trees of a particular age, and rapid re-growth of usable trees is difficult, if not impractical. Therefore, a sheeting material having similar structural properties of plywood sheets, yet manufactured of man-made and readily available materials would be desirable.

Further, in certain areas prone to extreme weather (hurricanes, tornadoes, etc.), extreme low air pressures typical of such weather disturbances can be destructive of buildings constructed by securing plywood to the framing by nails alone, as is the common practice. Additional securing measures are desirable, but cumbersome as applied to plywood construction. Therefore, a building material which can be more easily secured against damage by extreme weather conditions would be desirable

SUMMARY OF THE DISCLOSURE

Therefore, in order to address these and other deficiencies in the prior art, provided according to the present invention is a roll-out sheet of construction material having a plurality of slats. Each slat includes a shelf with a generally upward facing surface and a ledge with a generally downwardly facing surface. The slats are adjacent to one another so that the ledge of one slat overlies the shelf of an adjacent slat. In this way slats are in contact with, and supported by, the adjacent slats. A load-bearing flexible film is secured to the plurality of slats on one side. The opposite sides of the slats from the flexible film are free, allowing the slats to articulate relative to one another. The appropriate flexible film has a resistance to shear stress in the plane of the film. In other words, the flexible film should be strong enough to resist tearing while supporting the slats in a vertical orientation.

Preferably, multiple slats making up a roll-out sheet include a configuration in which slats are arranged end to end, with the junction of two slats arranged at an intermediate point along the length of a laterally adjacent slat. The slats may have a longitudinal opening at least partially through, which is optionally filled with thermal and/or sound insulation, and/or a load-bearing filler.

Slats having openings can also include a rib or support extending across the opening and bracing one side wall of the slat against the other. The rib or support is a support, which can be integrally formed with one side wall and bracing against the opposite side wall. A securing tab can extend outward from one or more slats, shaped as a hoop, or having a through opening. When deployed, the roll-out sheet may be flat or have some angle or curvature.

An embodiment of the present invention includes a slat for use in a roll-out sheet of construction material. The slat has at least one post member formed at a first lengthwise side of the slat; and at least one clamp assembly disposed at an opposing lengthwise side to the at least one post member and aligned with the at least one post member. The clamp assembly is dimensioned to rotably lock with the at least one post member of an adjacent slat. Also, a shelf member is arranged at a lower portion of the slat along the first lengthwise side or the second lengthwise side. At an opposing side of the slat, a ledge member is formed, and dimensioned to rest on the shelf member of an adjacent slat. The shelf member is adapted for bearing a load translated along the ledge member of adjacent slats. The shelf includes an upward facing surface and the ledge includes a downwardly facing surface which overlies the upwardly facing surface of the shelf of an adjacent slat in the rolled out configuration.

Yet another embodiment of the roll-out sheet building material of the present invention includes a plurality of slats and a connector member. Each slat has at least one connector opening formed at each of a first lengthwise side and a second lengthwise side of the slat. Also, each slat is formed with a shelf portion extending laterally and arranged at a lower portion of the slat along the first lengthwise side; and a ledge portion formed to accommodate the shelf portion and rest against a top surface of the shelf portion. The shelf portion is adapted for bearing a load when the roll-out sheet is in use. The ledge portion is formed along the second lengthwise side and adapted for distributing the load to the shelf portion of an adjacent slat of the plurality of slats when the roll-out sheet is in use. The connector member has a holding portion at each end of a cross portion. The holding portion is adapted for insertion into the connector opening and holding a slat of the plurality of slats to the adjacent slat.

BRIEF DESCRIPTION OF THE DRAWINGS

These and other features, benefits and advantages of the present invention will be made apparent with reference to the following detailed description and accompanying figures, where like reference numerals refer to like structures across the several views, and wherein:

FIG. 1(A) illustrates a second embodiment of a roll-out sheet of building material in cross-sectional view;

FIG. 1(B) illustrates a third embodiment of a roll-out sheet of building material in cross-sectional view;

DETAILED DESCRIPTION OF DISCLOSURE

Figure 1:
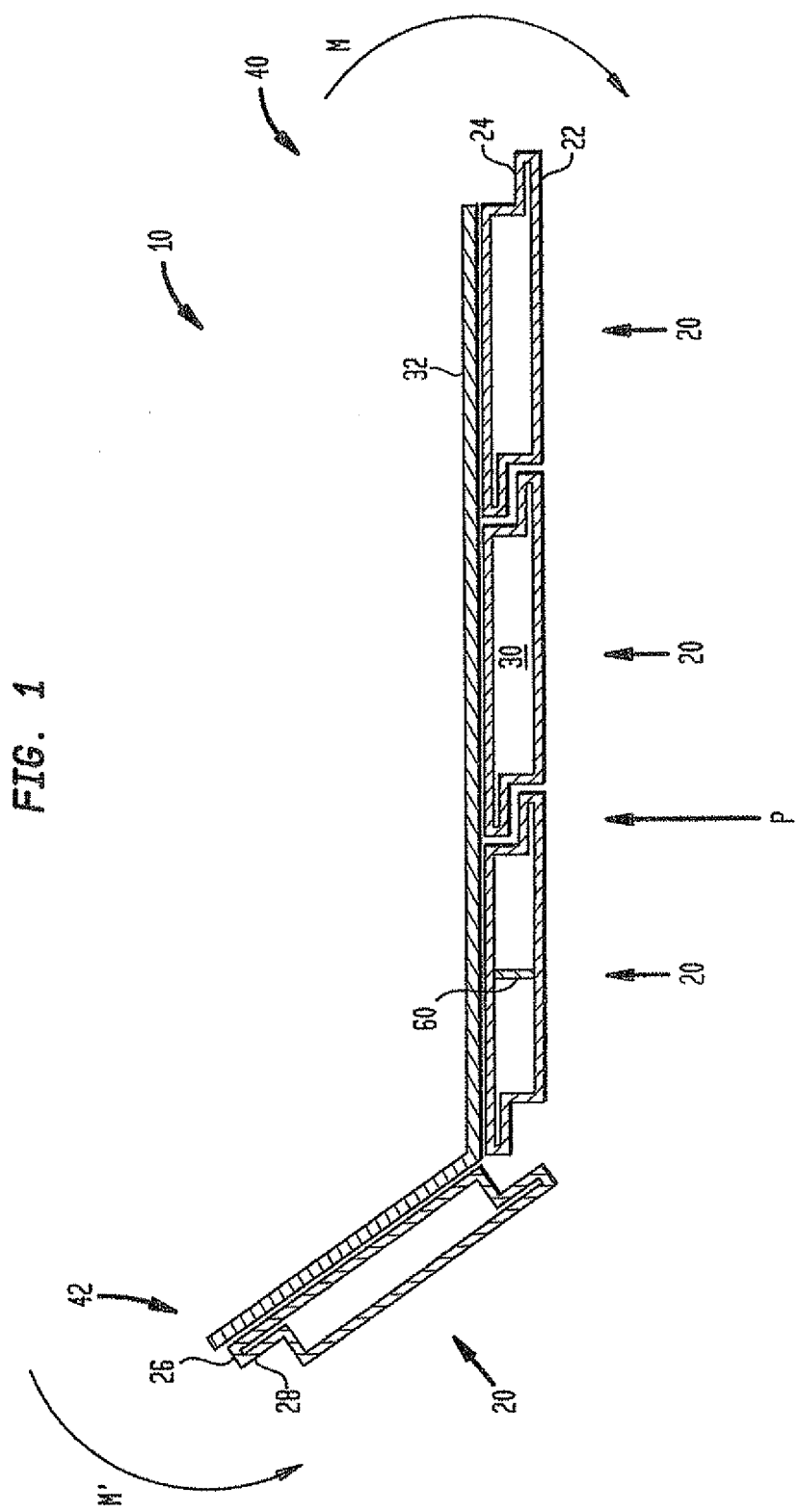
FIG. 1 illustrates a side end view of a roll-out sheet of building material according to a first embodiment of the present invention.

Referring now to FIG. 1, illustrated is a side end view of a roll-out sheet, generally 10, according to a first embodiment of the present invention. Roll-out sheet 10 comprises a plurality of transverse slats 20. Transverse slats 20 preferably have identical cross-sections to one another throughout the roll-out sheet 10. Each slat 20 has at one end a shelf 22 including a generally upward facing surface 24. A ledge 26 is at an opposite end from the shelf 22, the ledge 26 including a generally downwardly facing surface 28. The surfaces 24 and 28 may be parallel with the outer walls of the slat 20, as illustrated in FIG. 1, as one arrangement among others that yields a flat roll-out sheet 10. Alternately, some or all of the surfaces 24, 28 may be concave or convex, or angled relative to the outer wall of the slat 20 or to each other, which allows for the roll-out sheet 10 to be other than flat when deployed. In this and other figures, clearances are exaggerated to show the parts of the present invention, and the figures should not be interpreted as being to scale.

Slats 20 may be of solid cross-section, for example if manufactured of wood, plastic, or metal. Alternately, the slats may have an opening 30 longitudinally through the slat 20. Such slats 20 having an opening 30 may be produced by extrusion of metal or plastic, or bent metal sheet, for example. Opening 30 may be advantageously filled with another material, for example one or more of foam or fiberglass, as insulation against transfer of heat and/or sound.

Slats 20 are positioned adjacent one another with the downwardly facing surface 28 of the ledge 26 on one slat opposing the upwardly facing surface 24 of the shelf 22 on an adjacent slat. So positioned, on one side of the slats 20 a flexible film 32 is secured to the plurality of slats, for example by adhesive bonding. The film 32 is resistant against shear stresses in the plane of the film 32, thus capable of supporting the weight of the slats in a vertical orientation without tearing. As an example only, film 32 is a material known in the construction trade as biaxial nylon, which is impregnated with strands along two intersecting and perpendicular directions to improve load bearing strength.

In an alternate embodiment, the flexible film 32 and/or slats 20 may include KEVLAR® material, for protection against penetration while remaining lightweight. More preferably, the flexible film material can have properties of self-sealing against punctures, for example as exhibited in the material sold under the trade name ICE AND WATER SHIELD® by Grace Construction Products. Therefore, when used, for example, as roofing material, the roll-out sheet 10 can be secured to the framing by conventional roofing nails, and the surface of the roof would have an intact barrier, obviating the need to apply an additional barrier layer, as with more conventional construction techniques.

Moreover, in a preferred embodiment, the flexible film material presents an enhanced-friction exterior surface, preferably at least comparable to conventional plywood. At a minimum, the enhanced-friction exterior surface will enable a worker to obtain secure footing while wearing conventional footwear, notwithstanding the slope of a roof that is conventional in residential or other types of construction. The enhanced-friction exterior surface can be provided by one or more of roughing the exterior surface of the flexible film material, providing protrusions above the surface of the flexible film, or by adhesion or implantation of friction-enhancement, whether chemical adhesive material, granular material, or otherwise. In certain further embodiments, the exterior surface of the flexible film material may itself comprise a roofing or siding material that would otherwise have been applied to a plywood surface using conventional construction techniques.

As described, roll-out sheet 10 is flexible, so that slats 20 are able to deflect to the film side of the roll-out sheet 10 to allow roll-out sheet 10 to be reconfigured in a more compact format, for example folded over itself one or more times, or, more preferably, rolled into a generally cylindrical shape. However, in the unrolled configuration, roll-out sheet 10 supported at ends 40, 42, can support an intermediate load P, and/or beam bending moment couple M-M'.

Referring now to FIG. 1(A), an alternate embodiment of a roll-out sheet 210 is illustrated in cross-sectional view. While generally similar to the embodiment of FIG. 1, slats 220 of this embodiment lack the shelf or ledge as in the previous embodiment. In this embodiment, adjacent slats engage one another through a system of corresponding holes 222 and pins 226. As adjacent slats 220, connected with one another by flexible film 232 pivot into engagement with one another, pins 226 project into holes 222, thereby providing vertical stability among the slats 220. Through holes 222 are provided where the material of the slat is thinner than the length of the pin 226. In other cases, however, the pins 222 may be received in a recess in the adjacent slat 220.

In this or other embodiments, additional through holes (not shown), may be provided in one or more slats 220, preferably axially aligned among the plural slats 220, without corresponding pins, for accommodating a securing line, as explained further, infra.

Also illustrated in FIG. 1(A), but generally applicable to other embodiments, slats 220 are open to the side opposite flexible film 232. In this embodiment, the slats are filled with a foam insulation material 280. However, the slats 220 need not be closed on all sides, whether completely or partially, if the demands of the application do not require it. Accordingly, the entire roll-out sheet 210 may be lighter and less expensive for the reduction in material.

Referring now to FIG. 1(B), yet another embodiment of a roll-out sheet 310 is illustrated in cross-section. This embodiment is characterized by the accommodation of tongues 326 on one side of slats 320 into grooves 322 on an opposite side of the adjacent slat 320. Tongue 326 may be provided with a relief 328 to accommodate angular articulation of one slat relative to another. The present embodiment will be appreciated by one skilled in the art in light of the instant disclosure to function in a similar manner as the foregoing embodiments.

Figure 2:
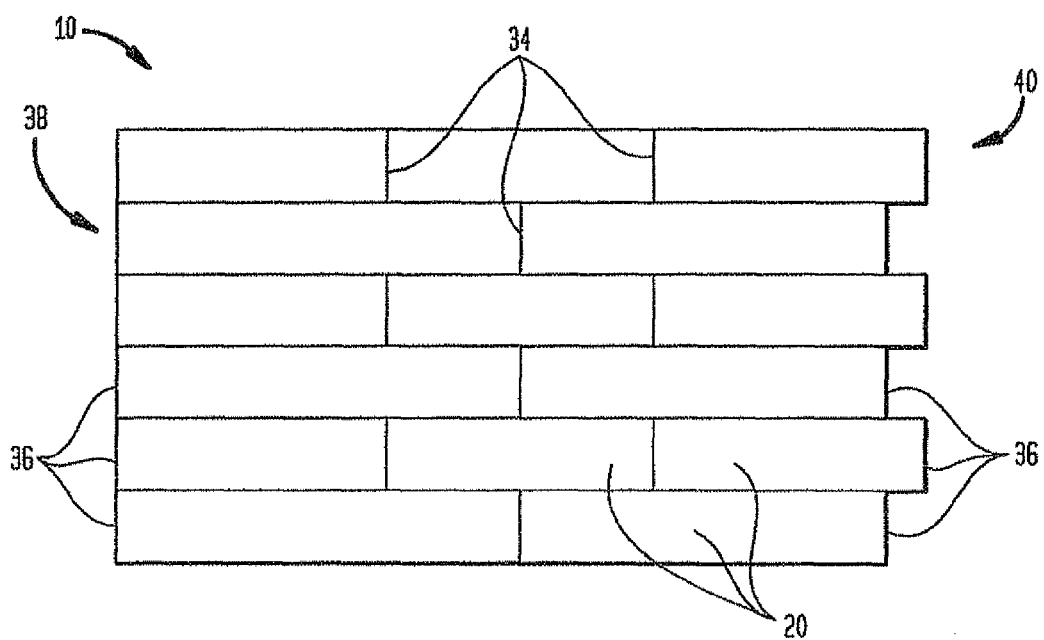
FIG. 2 illustrates a bottom view of the roll-out sheet according to a further embodiment of the present invention.

Referring now to FIG. 2, illustrated is a bottom view of the roll-out sheet 10 according to a further embodiment of the present invention. In certain embodiments, the slats 20 may extend the complete width of the roll-out sheet 10. However, as illustrated in FIG. 2, slats 20 may be shorter than the width of the roll-out sheet 10. Therefore, roll-out sheet 10 may be nearly any conceivable width, without limitation by the practical length of slats 20. In the embodiment of FIG. 2, the slats 20 are arranged in a so-called running bond, whereby the end-to-end junctions 34 of two horizontally adjacent slats 20 are positioned at an intermediate point along the length of a vertically adjacent slat 20. Accordingly, the end-to-end junctions 34 of slats 20 are supported by adjacent slats 20, and the roll-out sheet 10 is more resilient against beam bending loads in the longitudinal direction of the slats 20, i.e., transverse to the moment couple M-M' of FIG. 1.

According to one embodiment, the ends 36 of the slats 20 can present a straight edge 38 of roll-out sheet 10. Alternatively, the ends 36 of roll-out sheet 10 present a castellated edge 40. In the latter case, two laterally adjacent roll-out sheets with castellated edges may be intermeshed with one another, or alternatively these edges may be joined by complementary filler joint, which may be adapted to join two sheets in one instance, or to cap an end to present a flush edge with others.

Moreover, because the roll-out sheet 10 can be conceivably any practical dimensions, building contractors are not limited to the standard 4'×8' unit size of plywood for the same level of manageability by the workers doing the installation. Roll-out sheets 10 can be fabricated to specification, or even cut to length on-site with a simple utility knife, within the limitations of the flexible film 32. Accordingly, installation is faster than plywood mounting, requiring less manpower and less total man-hours than comparable plywood construction. Advantages over alternate construction techniques are similarly realized.

Figure 3:
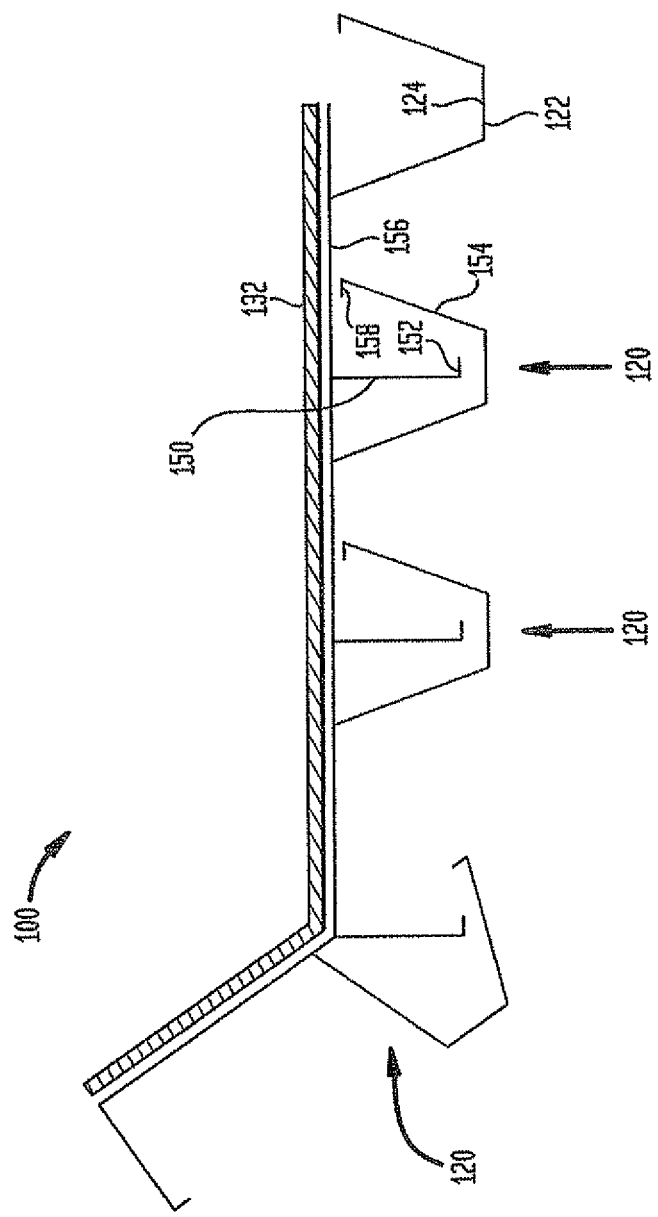
FIG. 3 illustrates a roll-out sheet according to a second embodiment of the present invention.

Referring now to FIG. 3, illustrated is a roll-out sheet, generally 110, according to a second embodiment of the present invention. Features of the roll-out sheet 100 common with the first embodiment will be generally dispensed with. In the second embodiment, roll-out sheet 110 has slats 120 that lend themselves to formation by a sheet metal bending process, although extrusion, rolling or other processes are applicable as well. A flexible film 132 is secured to the plurality of slats 120.

Slats 120 have a first shelf 122 with a generally upwardly facing surface 124 at one end of the slat 120, and a leg 150 at an opposite end of slat 120 from the shelf 122. As arranged in the roll-out sheet 110, leg 150 is in contact with shelf 122, and limits the movement of the adjacent slat 120. In more preferred embodiments, leg 150 includes a tab 152 that rests generally parallel with surface 124 in order to distribute forces by contact of leg 50 with shelf 122. Similarly, in more preferred embodiments, a portion of the slat 120 on an opposite side from the leg 150 includes an upwardly directed portion 154 in contact with an underside surface 156 of an adjacent slat 120. Upwardly directed portion 154 preferably includes a tab 158 generally parallel with underside surface 156 in order to distribute contact forces.

Figure 4:
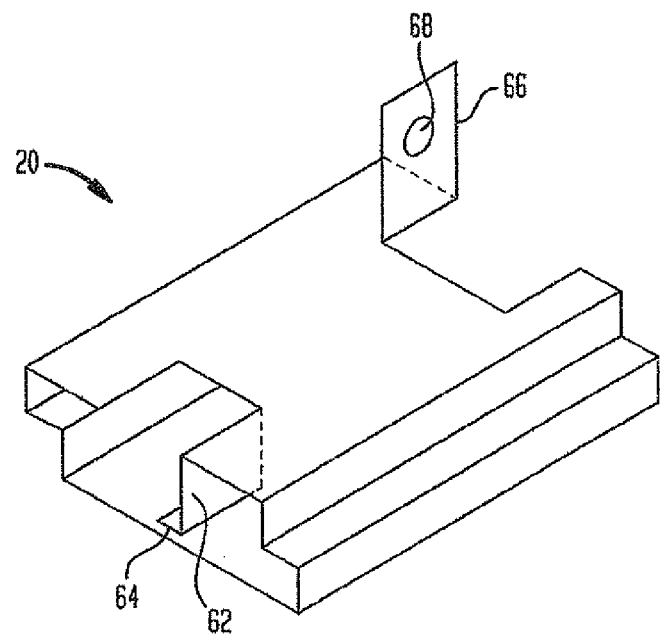
FIG. 4 illustrates a perspective view of an alternate embodiment generally similar to the embodiment of FIG. 1.

Referring now to FIG. 4, illustrated is a perspective view of an alternate embodiment generally similar to the embodiment of FIG. 1. The slat 20 of FIG. 4 can be considered formed from a sheet material in which additional structural features can be punched from the walls of the slat 20, FIG. 1 illustrates that slats 20 may be reinforced by providing one or more longitudinal ribs 60 within opening 30. Lateral ribs can be provided alternately or additionally. Ribs 60 may be straight, as illustrated, or formed at any angle, and be present singly or a plurality, for example in the form of corrugation. Alternately, fill material may be load bearing.

Either ribs 60 or supports 62, typically shorter in length than ribs 60, may be formed from the material of slat 20 itself and deflected inward to support against the opposing wall of the slat 20, as illustrated in FIG. 4. Alternately, the ribs 60 and supports 62 can be provided without removing or deflecting material from the wall of the slat 20. Supports 62 or ribs 60 may further include a tab 64 generally parallel to the opposing wall of the slat 20, in order to distribute contact forces.

Slat 20 as shown in FIG. 4 also includes a securing tab 66 extending outward from the wall of the slat 20. Securing tab 66, includes a through opening 68, which may be surrounded by the securing tab 66 as shown, which or may extend to an edge of the securing tab 66. Alternately, securing tab 66 may be formed as a hook. A securing line, e.g., a cable, chain, cord, etc., may be passed through the through opening 68 of one or more slats 20, and secured to a remote position, e.g., the foundation of the building, in order to help retain the roll out sheet 10 against displacement by adverse weather conditions.

Alternately or additionally, a securing line and one or more complementary through openings 68 may be provided internally to the slats 20 of roll-out sheet 10. The securing line may be inserted through the through openings of one or more slats 20 and one or more roll-out sheets 10. Moreover, applying tension to the securing line and connecting the securing line to at least two slats 20 of the roll-out sheet 10 will compress the slats 20 against one another and give increased rigidity to the roll-out sheet 10 in the unrolled configuration. Tension may be applied by turnbuckle, threaded nut on at least one end of the securing line, or other means which will be apparent to those skilled in the art in light of the instant disclosure. This embodiment of tensioning a securing line within the roll-out sheet 10 to increase rigidity is particularly applicable to the free-standing embodiments, described, infra.

In FIG. 4, an abbreviated length of slat 20 is illustrated to more clearly show support 62 and tab 66. However, either or both of support 62 and tab 66 are more preferably located along the longitudinal length of slat 20, rather than at an end thereof.

Figure 5:
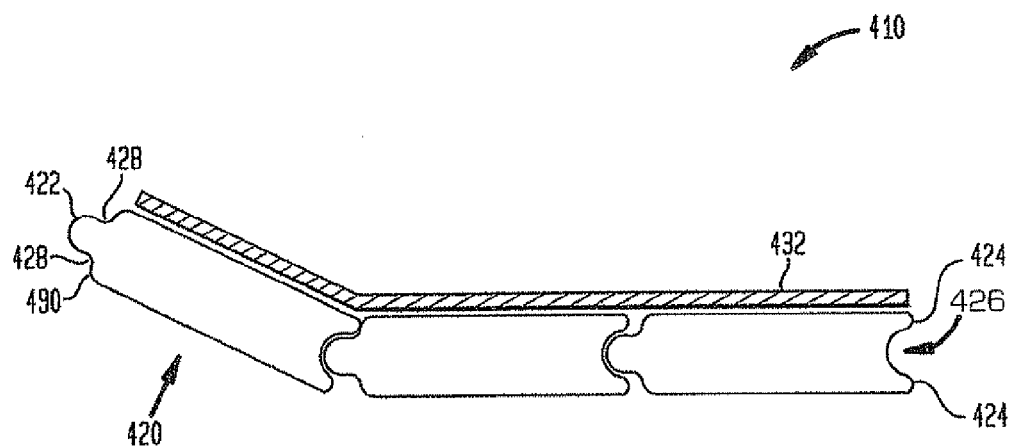
FIG. 5 illustrates a fourth embodiment of a roll-out sheet of building material in cross-sectional view.

Referring now to FIG. 5, yet another embodiment of a roll-out sheet 410 is illustrated in cross-section. This embodiment is characterized by a rounded projection 422 on one side of the slats 420. Projection 422 is received in a corresponding socket 426 of an adjacent slat 420. Projection 422 has recesses 428 inward of the projection 422 for receiving the ends 424 of socket 426. Moreover, on a lower side of the projection 422, opposite the flexible film 432, a stop 490 limits the articulation of the slat 420. With sufficient resiliency of ends 424, flexible film 432 may be eliminated in this embodiment. The present embodiment will be appreciated by one skilled in the art in light of the instant disclosure to function in a similar manner as the foregoing embodiments.

As described, the roll-out sheet is contemplated as a building material, particularly a replacement for plywood sheeting used in covering the frames walls and/or roofs. However, the invention is not limited to that application, has myriad other uses. For example, load-bearing sheets can be used a decking material, as a replacement for individual planks typically used in that application. The material can be used to bridge open spans, ranging from the size of a footbridge or smaller to that of a vehicle crossing or greater.

Figure 6:
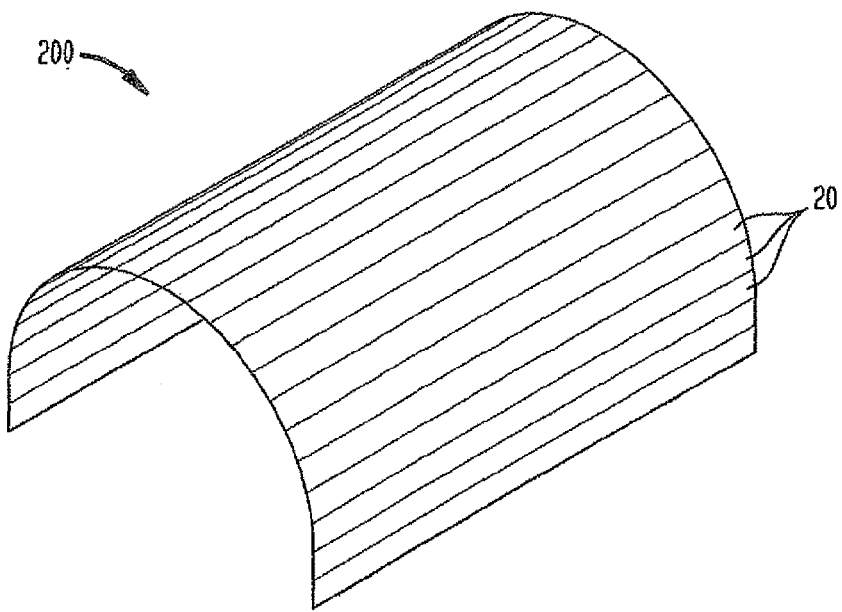
FIG. 6 illustrates a roll-out sheet forming a free-standing shelter according to a further embodiment of the present invention.

More particularly, as described, supra, the deployed configuration of the roll out sheet 10 can be curved or arched, not merely flat. This can be useful in the applications already described, and more particularly can allow the roll-out sheeting to form a free-standing shelter 200 (see FIG. 6), ranging in size from smaller than or equal to that of a doghouse or a utility shed, to a carport, to conceivably that of a aircraft hanger or larger. Notably, the curvature of the deployed roll-out sheet 10, i.e., the angle of one slat 20 relative to an adjacent slat 20, need not be constant throughout the sheet, but can be altered as the needs of the particular application demand. Other applications of a free-standing structure include a plank for bridging the span between a boat and a dock, which plank can be rolled up to either the dock side or the boat side as convenient.

Figure 7:
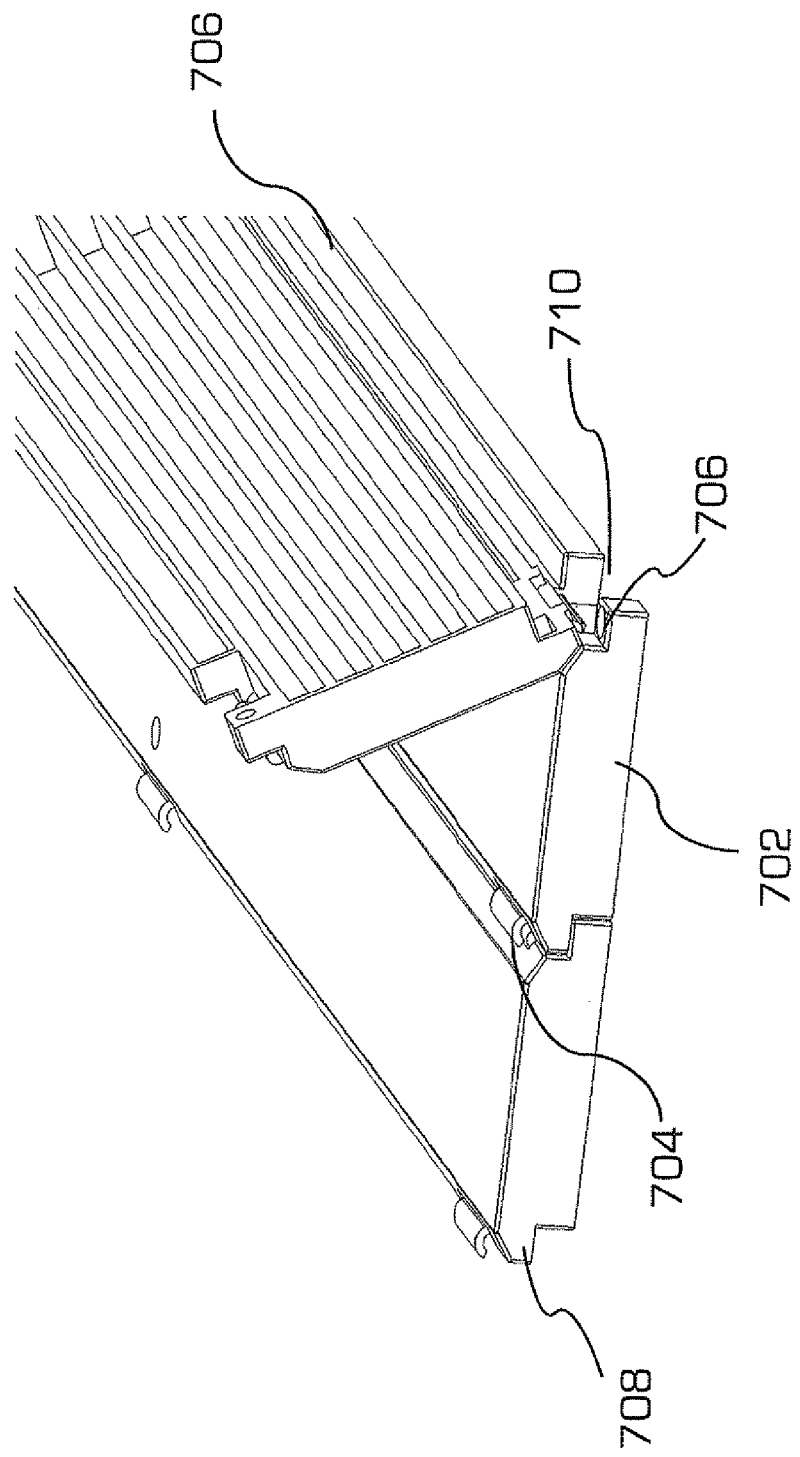
FIG. 7 illustrates a fifth embodiment of a roll-out sheet of building material in cross-sectional view.

An alternative embodiment is shown in FIG. 7. In the present embodiment, the flexible film described in the previous embodiments is not used for holding the slats 702 together. Instead, the slats 702 of the present embodiment are fabricated with pivot structures 704 formed along the lengthwise sides of each slat 702. However, as in the previous embodiments, a ledge 708 and shelf member 706 are formed on each slat 702 at opposite sides. When multiple slats 702 of the present embodiment are engaged, a bottom facing surface of the ledge 708 of a first slat 702 is in contact with and supported by the upwardly facing surface of the shelf member 706 of an immediately adjacent slat 702.

The shelf member 706 is formed at a first lengthwise end of each slat 702. The corresponding ledge 708 is formed at an opposing lengthwise side of the slat 702. The shelf member 706 allows for the top surface of the ledge 708 to lay flat and level with the top surface of the adjacent slats 702, thus providing a relatively smooth, flat top surface once the slats 702 engaged (i.e., rolled-out). The shelf member 706 provides support for each slat 702 when at a rest position so that the slat 702 is unable to rotate downward beyond the horizontal. In addition, the shelf member 706 includes a cutout 710 aligned with the pivot structure 704. The cutout 710 allows clearance for the pivot structure 704.

In an alternative, the shelf member 706 and the ledge 708 can be shaped to allow a supported rest position beyond the horizontal in order to allow the roll-out sheet of the present embodiment to form arches or curves.

Figure 8:
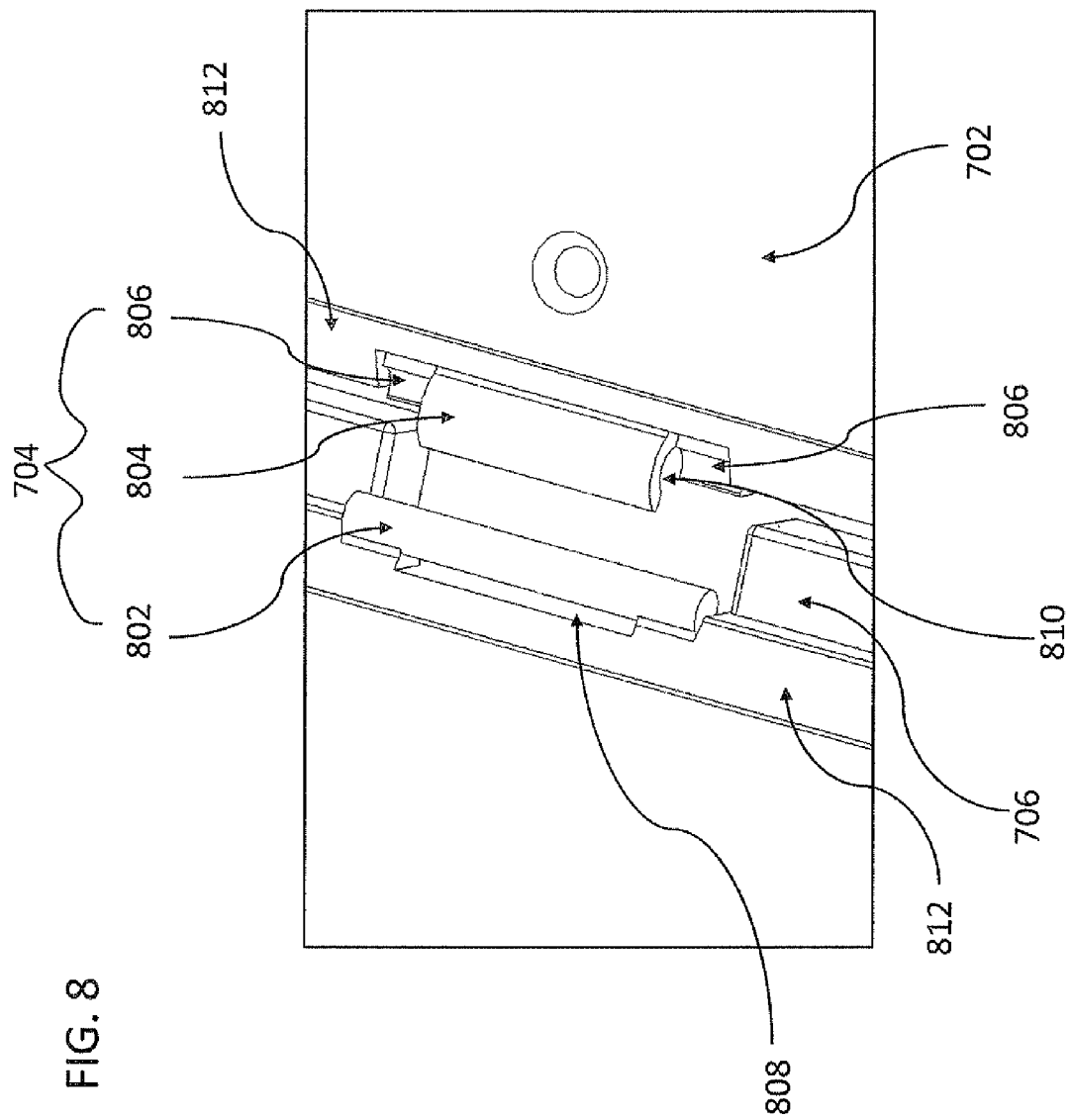
FIG. 8 illustrates an enlarged view of the hinge assembly of the fifth embodiment of a roll-out sheet of building material.

Turning now to FIG. 8, an enlargement of the pivot structure 704 is shown. The pivot structure 704 is formed of three component parts, namely a post member 802, an upper clamp portion 804 and a lower clamp portion 806. In FIG. 8, the shelf member 706 is shown as being disposed on the side of the slat 702 having the post member 802 formed thereon, however in practice the shelf member 706 can be formed on either lengthwise side of the slat 702, provided that enough clearance is present to allow free upward rotation of the slats 702 when linked together.

The post member 802 has a generally cylindrical shape, attached at both ends to the slat 702. A void 808 is formed between the slat 702 and the post member 802. The void 808 is sized to allow easy rotational movement of the upper clamp member 804 around the post member 802. The upper clamp member 804 and the lower clamp member 806 are positioned in vertical opposition to one another with a space 810 therebetween for holdingly accommodating the diameter of the post member 802.

As shown in FIG. 8, the upper clamp member 804 and the lower clamp member 806 can be offset from one another, or in the alternative, the upper clamp member 804 and the lower clamp member 806 can be positioned one above the other. In addition, the upper clamp member 804 and the lower clamp member 806 have curved cross-sections. Moreover, the upper clamp member 804 and the lower clamp member 806 can each be single elements or formed of multiple components. For example, in FIG. 8, the lower clamp member 806 is shown as two separate members, one on either side of the upper clamp member 804.

FIG. 7 shows the present embodiment having two pivot assemblies 704 per slat 702. However, in practice the present embodiment may be constructed with more than two pivot assemblies 704 spaced at intervals along the lengthwise side of the slat 702.

The slats 702 can have a beveled edge 812 on the top surface of the slats 702. The beveled edge 812 allows the slats 702 to have a greater degree of rotation upward. Ideally, the bevel edge 812 is dimensioned to allow one slat 702 to fold up and lay flat on the top surface of a second slat 702, as this will reduce storage size. The beveled edge 812 can be provided on one or both lengthwise sides of the slats 702.

Alternatively, the slats 702 can be formed without the bevel edge 812. The purpose of the bevel edge is to provide for some freedom of movement of connected slats 702 while also having the hinge members (i.e., post member 802, upper clamp member 804 and lower clamp member 806) recessed below the top surface of the slats 702. However, the hinge members can protrude above the top surface of the slats 702, as well, which provides an increased freedom of movement.

Another alternative is to form the hinge members on a bottom surface of the slats 702. This configuration allows for the top surface of the slats 702 to form a smooth flat surface. In this configuration, the bottom surface may have bevels along the edges as disclosed above, or the hinge members may protrude below the bottom surface.

The slats 702 can be fabricated from any material capable of bearing the necessary loads and of forming the requisite component members described above. For example, plastic, aluminum, steel, metal alloys, composite materials, and any combination of these materials can appropriately be used in fulfillment of the present embodiment.

The present embodiment allows for simplification of the manufacturing process of the roll-out sheet. Removing the need for the flexible film described in the previous embodiments also reduces cost of manufacture. Moreover, the slats 702 can be easily coupled and disassembled as needed in the field, thus allowing for greater customization of the roll-out sheet by installers. In fact, slats 702 having different properties of strength and curvature in the rest position can be joined together on-site as required by a particular task.

Moreover, it should be noted that individual features and components of the first through fourth embodiments, as described above, can be incorporated into the present embodiment to provide the added benefits attributed to those features and components.

Additionally, the ease with which the slats 702 of the present embodiment can be snapped together and taken apart, allows for a more compact storage option. Besides rolling up a sheet of connected slats 702, the slats 702 can also be disconnected from one another and stacked one on top of the other Rolling up connected slats 702 can be useful for quick deployment of the roll-out sheet, while stacking the slats can save considerable space, and perhaps may be advantageous when being stored for an extended period of time. Further, the length of the roll-out material can be modified as needed to accommodate building requirements.

Figure 9:
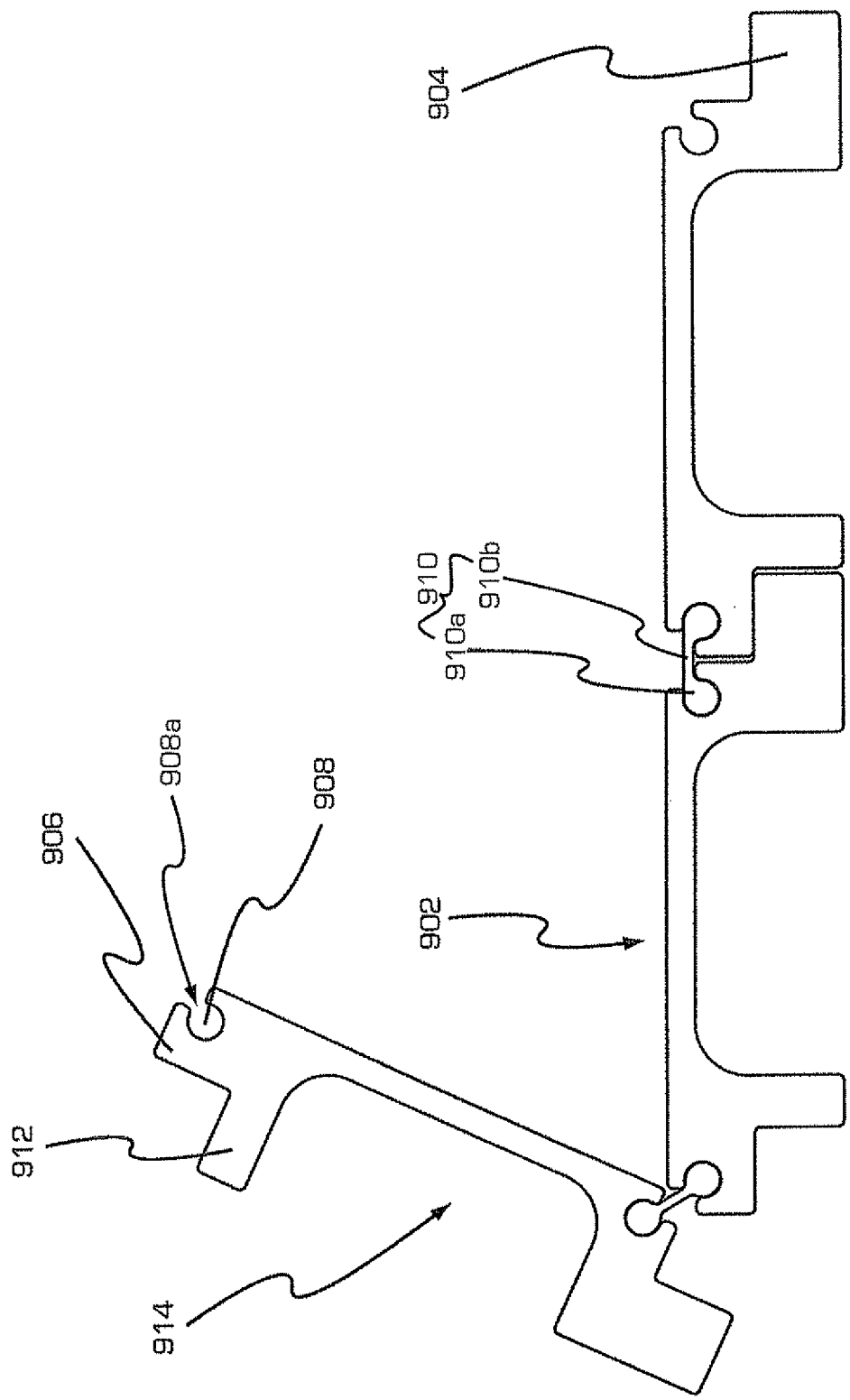
FIG. 9 illustrates a sixth embodiment of a roll-out sheet building material in cross-sectional view.

Turning to FIG. 9, another embodiment of the present invention is shown. In the present embodiment, each slat 902 is formed with a shelf portion 904 along a first lengthwise end and a ledge portion 906 along an opposite lengthwise end of the slat 902. Additionally, at both lengthwise ends connector opening 908 is formed.

In FIG. 9, the connector opening 908 is shown as having a substantially circular cross-section with a void 908a formed at a position along the circumference of the circular cross-section that is smaller than the diameter of the connector opening 908. The void 908a is formed and positioned to provide physical access to the interior of the connector opening. Proper positioning and dimensions of the void are evident in view of FIG. 9. However, other cross-sectional shapes can be used as well, for example rectangular or triangular. The purpose of the connector opening 908 is to hold a connector member 910 to the slats 902.

Preferably, the connector opening 908 is formed along the entire length of each lengthwise end of the slat 902. However, in the alternative, the connector opening 908 can be formed at the four corners of the slats 902.

In the case where the connector opening 908 runs across the entire length of the slat 902, the connector member 910 is dimensioned as a long strip having two holding portions 910a, one on either side of a cross portion 910b. The holding portions 910a can be circular, triangular or rectangular shaped, or any other appropriate shape, to conform to the cross sectional shape of the connector opening 908, while the cross portion 910b is dimensioned to fit within and pass through the void 908b. In the alternative case where the connector opening 908 is formed at each corner, the connector member 910 has the same shape as described above, except that the length of the connector member 910 is dimensioned to equal the length of the connector opening 908. The connector member 910 can be fabricated from rubber, plastic, or other suitable material.

The connector member 910 in the embodiment shown in FIG. 9, when formed to run the length of the slat 902, can provide a weatherproof joint between the connected slats 902, especially when the connector member 910 is formed of rubber. This waterproof feature is advantageous in applications of the slats 902 as hurricane sheathing or to other adverse weather conditions.

The slats 902 of the present embodiment are connected with the connector member 910 such that one of the holding portions 910a is inserted into the connector opening 908 of a first slat 902 and the second holding portion 910a is inserted into the connector opening 908 of a second slat 902. The cross portion 910b of the connector member 910 has a smaller cross section relative to the holding portions 910a and dimensioned to fit through the opening formed in the connector opening 908. The connector member 910 is inserted into place from a side of the slat 902.

Once connected as discussed above, the slats 902 can be articulated relative to one another. However, the ledge portion 906 of one slat 902 is supported by the shelf portion 904 of the adjacent slat 902. In this way, loads are distributed and supported by the slats 902 rather than by the connector members 910.

As a weight-saving measure, the slat 902 can be formed with a void 914 between two leg portions 912. Alternatively, the void 914 can be formed internal to the slat 902. Ribs can also be incorporated to provide additional rigidity if necessary.

Moreover, reinforcing bars (not shown), fabricated of steel, aluminum, or any of the applicable materials known in the art, can be used to reinforce one or more of the slats 902. The reinforcing bars may be formed as removable inserts, insertable into a receiving structure formed on a bottom surface of the slats 902. The reinforcing bars are disposed along the lengthwise side of a slat, either at one or both sides, or alternatively, across the slat, i.e. parallel with the slat. The purpose of the reinforcing bar is to provide greater rigidity, without imparting greater weight to the slats.

In order to receive the reinforcing bar, the slat can be formed with a reinforcement holding section on an underside surface of the slat, such that the reinforcing bar is wedged into the reinforcement holding member. In this case the reinforcing bar is held in place by frictional contact with the reinforcement holding section when the roll-out sheet is not deployed. However, when the roll-out sheet is in use the reinforcing bar is held in place by normal forces between the slat and the surface on which the slat rests. In another case, the reinforcing bar may be inserted into a void formed in the side of the slat and running the length of the slat. In this case, the reinforcing bar slides into the void and is in contact with the slat on all four sides forming the void. Additionally, other means for removably holding the reinforcing bar to a slat, as known in the art can be used in the alternative.

Alternatively, the reinforcing bar may be incorporated into the slats 902 as non-removable members, positioned either internal to the slat 902 or on the underside of the slat 902. The reinforcing bar are intended to provide structural rigidity when one or more of the slats 902 is expected to experience significant loads.

In the case where the connector member 910 is a strip running the entire length of a slat 902, the roll-out sheathing may be assembled with slats positioned in a staggered layout as shown in FIG. 2. This staggered layout also allows for a roll-out sheathing that is wider than the length of an individual slat 902. In the staggered layout, the shelf portion 904 of two side-by-side slats 902 support the ledge portion 906 of an adjacent slat 902. The connector member 910 in the staggered layout is, thus, shared by the three slats 902. Additionally, in this configuration of the connector member 910, the slats 902 can be of non-uniform lengths relative to one another.

Figure 10:
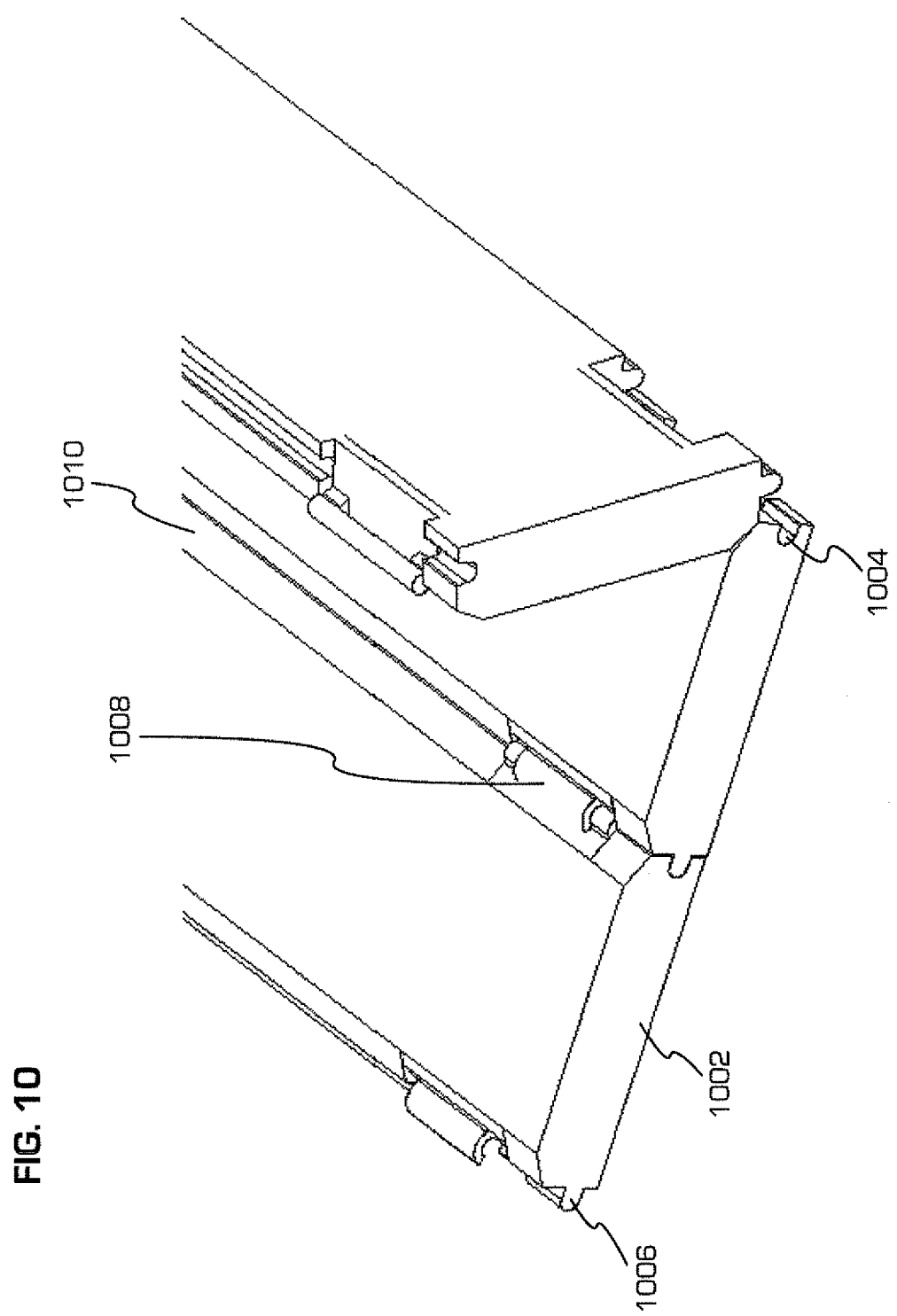
FIG. 10 illustrates a seventh embodiment of a roll-out sheet building material in cross-sectional view.

Another embodiment of the present invention is shown in FIG. 10. In the present embodiment, the slat 1002 has, on a first side, a rounded "bull-nose" notch 1004, and on the opposite side, a "bull-nose" tab 1006 dimensioned to snugly mate with the notch 1004 of an adjacent slat 1002.

As with the prior embodiments, the slat 1002 includes a pivot structure 1008. The pivot structure is fabricated as detailed above. Additionally, a bevel edge 1010 is formed on at least one side of a top surface of the slat 1002. The at least one side on which the bevel edge 1010 is formed is a side on which a component of the pivot structure 1008 is disposed.

When in use, the slats 1002 are coupled at the pivot structures 1008. As the coupled slats 1002 are rotated about an axis of the pivot structure 1008, the bull-nose tab 1006 of a first slat 1002 angles into, and lockingly engages with, the bull-nose notch 1004 of a slat 1002 immediately adjacent.

In this configuration, load is distributed to the interface between the tab 1006 and notch 1004. Additionally, the engagement of the notch 1002 and tab 1004 prevent the slats 1002 from easily rotating up, thus preventing any consequential bouncing of the slats 1002 that may occur as a load moves over the slats 1002.

Figure 11:
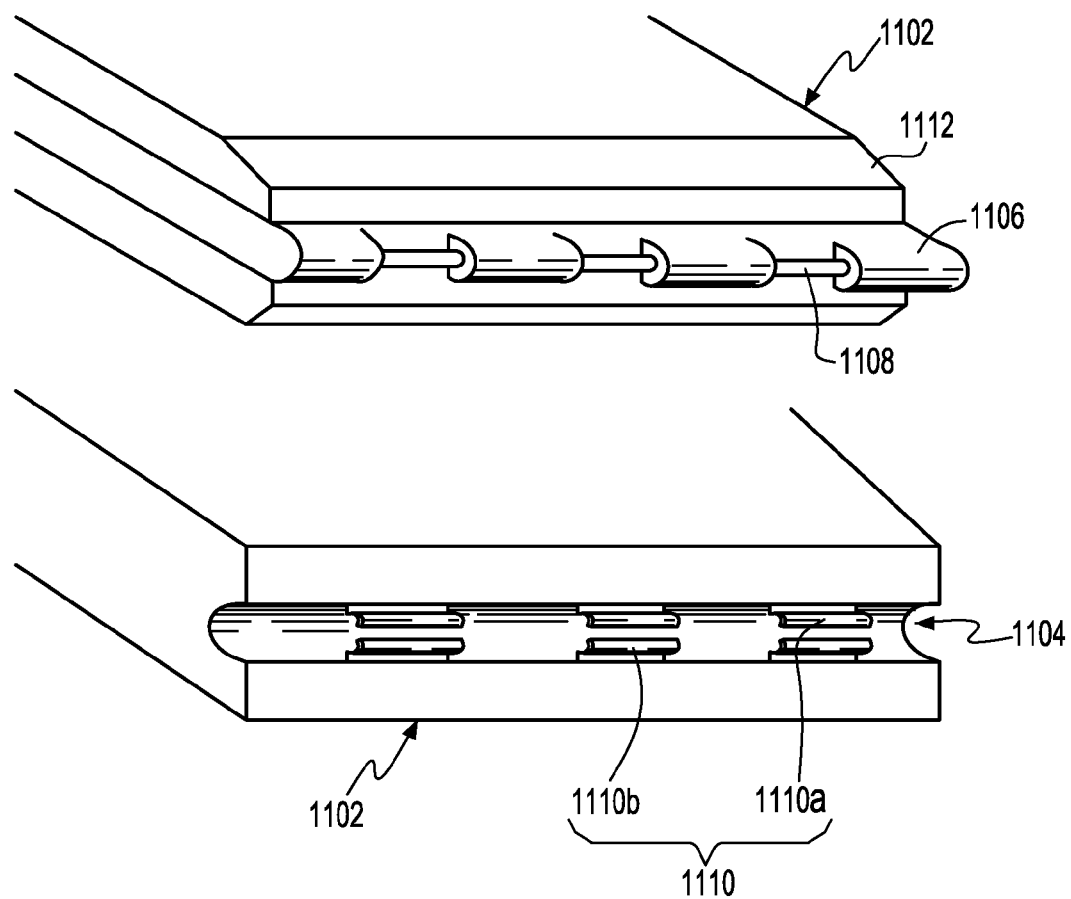
FIG. 11 illustrates an eighth embodiment of a roll-out sheet building material in cross-sectional view.

Another embodiment of the present invention, shown in FIG. 11, is a modification of the slat 1002 shown in FIG. 10. Specifically, rather than having the pivot structure 1008 disposed at a position above or below the central axis of the slat 1002, i.e., the horizontal axis running through the bull-nose notch and tab structures, the present embodiment provides a pivot structure formed on the central axis of the slat 1102.

In the present embodiment, the slat 1102 includes a notch 1104 running lengthwise along one side, and a bull-nose tab 1106 running lengthwise along an opposite side of the slat 1102. Pivot members 1108 are formed at intervals along the bull-nose tab 1106. These pivot members 1108 are cylindrical and anchored on either side to the bull-nose tabs 1106. Preferably, the pivot members 1108 are open along the circumference.

On the notch side of the slat 1102, the notch 1104 is disposed with a number of holding structures 1110, including an upper holding member 1110a and a lower holding member 1110b. The holding structures 1110 are dimensioned and positioned along the notch 1104 to interlock with pivot members 1108 of a second slat 1102.

In this configuration, once the bull-nose tab 1106 of one slat 1102 is engaged with the bull-nose notch 1104 of an adjacent slat 1102, the bull-nose tab 1106 is held in place by holding members 1110 formed within the bull-nose notch 1104. The holding members 1110 prevent the slats 1102 from separating due to a horizontal force, but still allow the slats 1102 to rotate vertically, up and down. The extent of the rotation of the slats 1102 is determined by the angle of the bevels 1112 that may be formed on some, or all, sides of each slat 1102. Moreover, forced rotation beyond the limit imposed by the bevels 112 results in the slats 1102 separating, thus allowing the slats 1102 to be easily separated when needed.

The slat as described above with respect to FIGS. 7-11, are designed to be customizably joined with any number of slats with a minimum of effort and, generally, without the need for tools. Thus, the roll-out sheathing systems shown in FIG. 7-11 may be provided as individual slats, which are then joined on-site by a contractor or homeowner.

In an alternative arrangement, a predefined number of slats may be provided prepackaged, and pre-joined. However, the modular design of the slats allows the user to easily remove unneeded slats from the roll-out sheathing or, when necessary, add additional slats to the ends of the roll-out sheathing.

The roll-out sheathing described herein has many uses ranging from roofing to flooring. The present invention is well suited for deployment as a temporary repair of damaged roofing and for temporary protection for windows, glass doors and other easily damaged structures of a residential or commercial structure in areas prone to hurricanes and other damaging conditions. Additionally, the present invention can be utilized as permanent building material for roofing and flooring. Moreover, the present invention can be utilized as a temporary road surface at construction and mining sites, where permanent cement or asphalt road surfaces are impractical. When intended as a surface for use by heavy vehicles, the slats of the present invention can be constructed of steel or aluminum and may be solid throughout.

The present invention has been described herein with reference to certain exemplary and/or preferred embodiments. These embodiments are offered as merely illustrative, and not limiting, on the scope of the invention. Certain other alterations and modifications may be apparent to those skilled in the art in light of the present disclosure, without departing from the spirit or scope of the present invention, which is defined solely with reference to the following appended claims.

What is claimed is:

1. A roll-out sheet of construction material formed of a plurality of slats, each slat comprising:
   at least one post member formed at a first lengthwise side of each slat;
   at least one clamp assembly disposed at a second lengthwise side of the slat opposite to the at least one post member and aligned with the at least one post member, the clamp assembly being dimensioned to rotatably lock with the at least one post member of an adjacent slat;
   a shelf member extending laterally and arranged at a lower portion of each slat along one of the first lengthwise side or the second lengthwise side, the shelf member adapted for bearing a load when the roll-out sheet is in use;
   a ledge member arranged at an upper portion of each slat along a lengthwise side opposing the shelf member, the ledge member being dimensioned and arranged for contacting the shelf member of an adjacent slat when in an unfolded rest position;
   a cut-out portion formed along the shelf member directly below the at least one post member or the at least one clamp assembly, to allow rotational movement of the at least one clamp assembly around the at least one post member; and
   a bevel edge formed along at least one lengthwise side at a top edge of the slat.

2. The roll-out sheet as in claim 1, wherein shelf member prevents downward rotation of connected slats beyond a defined angle.

3. The roll-out sheet as in claim 1, wherein the slat is constructed of any one of a group of materials consisting of plastic, aluminum, steel, metal alloys, composite materials, and any combination thereof.

4. The roll-out sheet as in claim 1, wherein the contact between the ledge member and the shelf member of the adjacent slat occurs between a downward facing surface of the ledge member and an upward facing surface of the shelf member.

5. A slat for use in a roll-out sheet of construction material, the slat comprising:
   at least one post member formed at a first lengthwise side of the slat;
   at least one clamp assembly disposed at an opposing lengthwise side to the at least one post member and aligned with the at least one post member, the clamp assembly being dimensioned to rotatably lock with the at least one post member of an adjacent slat;
   a shelf member arranged at a lower portion of the slat along one of the first lengthwise side or the second lengthwise side, the shelf member adapted for bearing a load when the roll-out sheet is in use;
   a ledge formed along a lengthwise side of the slat opposing the shelf member, the ledge member being dimensioned and arranged for contacting the shelf member of the adjacent slat when in an unfolded rest position;
   a cut-out portion formed along the shelf member directly below the at least one post member or the at least one clamp assembly, to allow rotational movement of the at least one clamp assembly around the at least one post member; and
   a bevel edge formed along at least one lengthwise side at a top edge of the slat.

6. The slat as in claim 5, wherein the shelf member prevents downward rotation of connected slats beyond a defined angle.

7. The slat as in claim 5, wherein the slat is constructed of any one of a group of materials consisting of plastic, aluminum, steel, metal alloys, composite materials, and any combination thereof.

8. The slat as in claim 5, wherein the slat further comprises:
   a cut-out portion formed along the shelf member directly below one of the at least one post member or the at least one clamp assembly; and
   a bevel edge being formed along at least one lengthwise side at a top edge of the slat.

9. The slat as in claim 5, wherein the contact between the ledge member and the shelf member of the adjacent slat occurs between a downward facing surface of the ledge member and an upward facing surface of the shelf member.

* * * * *